(12) United States Patent
Tse et al.

(10) Patent No.: US 11,963,279 B2
(45) Date of Patent: Apr. 16, 2024

(54) WEARABLE ELECTRONIC DEVICE

(71) Applicant: Hong Kong Applied Science and Technology Research Institute Company Limited, Hong Kong (HK)

(72) Inventors: Ming Leung Vincent Tse, Hong Kong (HK); Anson Chan, Hong Kong (HK); Yuelin Wang, Hong Kong (HK); Chun Zhang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 198 days.

(21) Appl. No.: 17/588,186

(22) Filed: Jan. 28, 2022

(65) Prior Publication Data

US 2023/0021838 A1 Jan. 26, 2023

Related U.S. Application Data (60) Provisional application No. 63/224,403, filed on Jul. 21, 2021.

(51) Int. Cl.
*H05B 47/00* (2020.01)
*H05B 47/10* (2020.01)

(52) U.S. Cl.
CPC .................................. *H05B 47/10* (2020.01)

(58) Field of Classification Search
CPC ...................................................... H05B 47/10
See application file for complete search history.

(56) References Cited

U.S. PATENT DOCUMENTS

| 4,091,610 | A | 5/1978 | Sasaki et al. |
| 5,403,980 | A | 4/1995 | Eckrich |
| 6,003,774 | A | 12/1999 | Bard et al. |
| 8,331,097 | B2 * | 12/2012 | Yang .................. A61B 5/6804 340/573.1 |
| 9,285,609 | B1 | 3/2016 | Rost |
| 10,043,125 | B2 | 8/2018 | Park |

(Continued)

FOREIGN PATENT DOCUMENTS

| CN | 107957678 A | 4/2018 |
| CN | 111551995 A | 8/2020 |

(Continued)

OTHER PUBLICATIONS

International Search Report and Written Opinion of corresponding PCT Patent Application No. PCT/CN2022/076377 dated May 6, 2022.

*Primary Examiner* — Gerald J Sufleta, II
(74) *Attorney, Agent, or Firm* — Idea Intellectual Limited; Margaret A. Burke; Sam T. Yip (57) ABSTRACT

A wearable electronic device including: a first portion and a second portion. The first portion includes a first conductive area on a first inner surface of the first portion and a third conductive area on a first outer surface of the first portion. The second portion includes one or more second conductive areas on a second outer surface of the second portion and a fourth conductive area on a second inner surface of the second portion, wherein the first portion is connected to the second portion. A circuit unit is disposed in a second space of the second portion, wherein the circuit unit is configured to enable an input/output unit of the circuit unit in response to the first conductive area and the second conductive areas are triggered.

13 Claims, 7 Drawing Sheets

(56) References Cited

U.S. PATENT DOCUMENTS

| | | | |
|---|---|---|---|
| 2012/0019373 A1 | 1/2012 | Kruse et al. | |
| 2016/0154425 A1* | 6/2016 | Yang | G06F 1/163 |
| | | | 361/679.03 |
| 2017/0131738 A1* | 5/2017 | Lai | G06F 1/163 |
| 2018/0088627 A1* | 3/2018 | Cheah | H01L 23/564 |
| 2018/0107168 A1* | 4/2018 | Han | G04G 17/08 |
| 2018/0157289 A1 | 6/2018 | Meyer et al. | |
| 2019/0187835 A1* | 6/2019 | Griffin | H04W 4/20 |
| 2019/0221922 A1* | 7/2019 | Ahn | H01Q 1/273 |
| 2019/0346941 A1* | 11/2019 | Griffin | G08C 17/00 |
| 2020/0241641 A1 | 7/2020 | Vescovi et al. | |

FOREIGN PATENT DOCUMENTS

| | | |
|---|---|---|
| CN | 112860062 A | 5/2021 |
| CN | 214125763 U | 9/2021 |
| EP | 1204067 B1 | 11/2003 |

* cited by examiner

WEARABLE ELECTRONIC DEVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a wearable electronic device, and in particular, to the wearable electronic device configured to output light, sound, wireless signal, to receive sound, wireless signal, and/or to sense one or more target objects.

BACKGROUND OF THE INVENTION

With the technological development, wearable electronic devices are becoming more and more prevalent. However, the many existing types of wearable electronic devices having various switches designs still have many shortcomings; for example, short battery life due to rich display, substantial sizes, unreliable under harsh environment, buttons are not durable, etc. that needed to be overcome.

For example, U.S. Pat. No. 6,003,774 discloses a "mechanical mechanism" switch/cord of a wearable electronic device to control the on/off status of the laser beam, which can be emitted from the wearable electronic device or to control the on/off status of a scan element for scanning a bar codes. Its disadvantage, however, is that the "mechanical mechanism" switch/cord can easily be damaged by unpredictable external forces under prolong usage.

U.S. Patent Application Publication No. 2020/0241641A1 discloses a capacitive sensing touchpad of a wearable electronic device being its input interface. Its disadvantage is that the cost of the touchpad is much higher relative to other types of the input mechanism. Furthermore, the touchscreen can also be easily damaged by unpredictable external forces, and that due to its weight and size, the wearable electronic device is not convenient for its user.

U.S. Pat. No. 9,285,609 discloses different types of switches in the inner surface of a wearable band of an electronic device for switching on its power. Its disadvantage is that this mechanism causes energy waste since the power consumption begins whenever the user put on the wearable band regardless of the actual use of the electronic device.

U.S. Pat. No. 10,043,125 discloses an annular touch surface as the input mechanism on the outer surface of a wearable electronic device. Its disadvantage is that this mechanism can cause a lot of mistouch since the area of the touch surface is large and closed to the skin of the user's finger.

SUMMARY OF THE INVENTION

It is an objective of the present invention to provide a wearable electronic device that addresses the aforesaid shortcomings in the current state of the art. The wearable electronic device includes a first portion and a second portion. The first portion includes a first conductive area on a first inner surface of the first portion and a third conductive area on a first outer surface of the first portion. The second portion includes one or more second conductive areas on a second outer surface of the second portion and a fourth conductive area on a second inner surface of the second portion, wherein the first portion is connected to the second portion, wherein a circuit unit is disposed in a second space of the second portion. A first node of the circuit unit is electrically connected to the third conductive area, and a second node of the circuit unit is electrically connected to the fourth conductive area. The circuit unit is configured to enable an input/output unit of the circuit unit in response to the first conductive area and the second conductive areas are triggered.

BRIEF DESCRIPTION OF THE DRAWINGS

Embodiments of the invention are described in more details hereinafter with reference to the drawings, in which.

DETAILED DESCRIPTION

In the following description, a wearable electronic device configured to enable an I/O unit of the wearable electronic device in response to a first conductive area and one or more second conductive areas being triggered and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
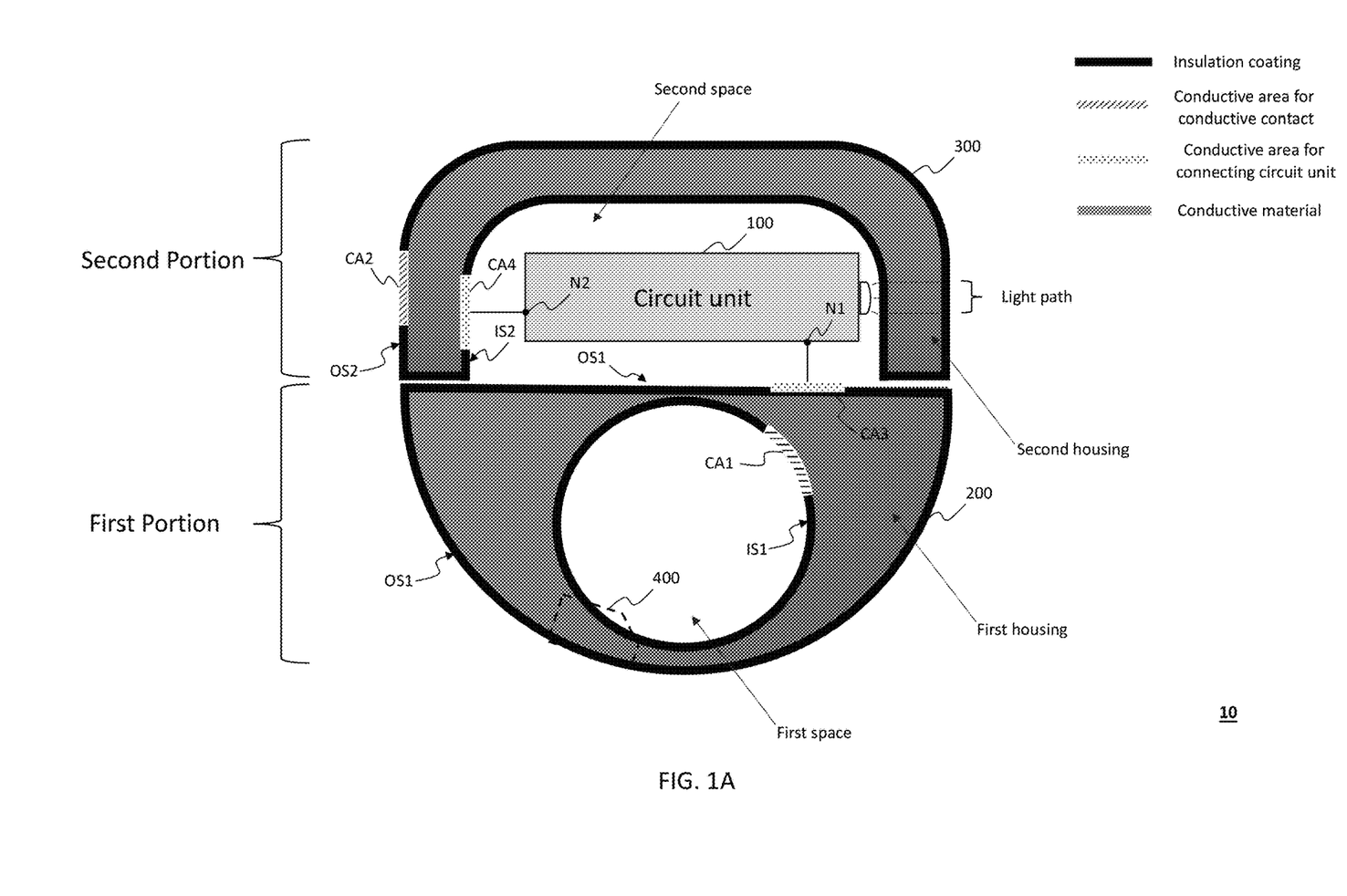
FIG. 1A depicts a block diagram illustrating a wearable electronic device in accordance with one embodiment of the present invention.

Referring to FIG. 1 in the following description. In accordance with various embodiments of the present invention, provided is an electronic device 100 that includes a first portion 200 and a second portion 300. A circuit unit 100 is disposed in a second space of the second portion 300. The first space is an open space surrounded by a first housing of the first portion 200. The second space is a close space enclosed by the second housing of the second portion 300. When a user wears the wearable electronic device 10 on a part of the user's body (e.g., arm, wrist, finger, limb, or the likes), the first inner surface of the first space is touching the skin of the part of the user's body. For example, the wearable electronic device 10 is a smart ring being worn on a finger of the user, or the wearable electronic device 10 is smart armband wrapping around an appendage (e.g., upper arm) of the user. In another embodiment, the first housing can hold or be fixed on to the part of the user by adjusting the joint element 400.

The first portion 200 includes a first conductive area CA1 on a first inner surface IS1 of the first portion 200 and a third conductive area CA3 on a first outer surface OS1 of the first portion 200. The second portion 300 includes one or more second conductive areas CA2 on a second outer surface OS2 of the second portion 300 and a fourth conductive area CA4 on a second inner surface IS2 of the second portion 300. The first portion 200 may be connected to the second portion 300 via mechanical connection mechanism or adhesive mechanism. An ordinarily skilled person in the art would appreciate that other mechanisms are readily adapted for this purpose of connecting the first portion 200 to the second portion 300 without undue experimentation or deviation from the spirit of the present invention.

A first node N1 of the circuit unit 100 is electrically connected to the third conductive area CA3, and a second node N2 of the circuit unit 100 is electrically connected to the fourth conductive area CA4. The circuit unit 100 is configured to enable an input/output (I/O) unit of the circuit unit 100 in response to the first conductive area CA1 and the second conductive areas CA2 are triggered.

A first housing of the first portion 200 is formed by a conductive material, and a second housing of the second portion 300 is formed by the conductive material or a further conductive material. The conductive material and the further conductive material can be one or more of conductive metals (e.g., aluminum), conductive alloy, nonmetallic conductors such as graphite and conductive polymers, and/or combinations thereof. An ordinarily skilled person in the art would appreciate that other materials are readily adapted for the conductive material and the further conductive material without undue experimentation or deviation from the spirit of the present invention.

The first outer surface OS1 and the first inner surface IS1 of the first housing, other than the first conductive area CA1 and the third conductive area CA3, are coated with an insulation material. The second outer surface OS2 and the second inner surface IS2 of the second housing, other than the second conductive areas CA2 and the fourth conductive area CA4, are coated with the insulation material or a further insulation material.

The insulation material or the further insulation material is a material in which electric current does not flow freely. For example, the insulation material or the further insulation material can be one or more of silicon dioxide ($SiO_2$), silicon nitride ($Si_3N_4$), silicon oxynitride (SiON), tantalum pentoxide ($Ta_2O_5$), aluminum oxide ($Al_2O_3$), other material having similar insulating and structural properties and/or combinations thereof. An ordinarily skilled person in the art would appreciate that other materials are readily adapted for the insulation material and the further insulation material without undue experimentation or deviation from the spirit of the present invention.

In a preferred embodiment, Aluminum and Anodic Aluminum Oxide (AAO) are selected to be the materials of the housing and the coating respectively. The reasons are: (1) AAO is electro-chemically grown on surface of aluminum. It would not chip or peel like paint or plating on other metals. (2) AAO is highly corrosion resistant. One unique property of anodic aluminum oxide is the naturally formed nanopores, allowing effective dyeing of any color, and therefore, wide range of thickness and colors is possible for the coating. The color for anodic titanium oxide depends on the thickness of the oxide.

The first conductive area CA1, the second conductive areas CA2, the third conductive area CA3, and the fourth conductive area CA4 are formed by removing the insulation material or the further insulation material originally coated on the first conductive area CA1, the second conductive areas CA2, the third conductive area CA3, and the fourth conductive area CA4 respectively. For example, after the entire second outer surface OS2 of the second portion 300 of the wearable electronic device 10 are coated by the aluminum oxide $Al_2O_3$, the coating of one or more customized/predetermined positions and patterns are removed. Such that, the conductive material beneath the removed coating is exposed, and the exposed areas form the second conductive areas CA2 (also known as the hidden switches). Since the user interfaces of the hidden switches (e.g., the first conductive area CA1, the second conductive areas CA2), not having the mechanical moving parts, are created by simply removing the original coating, the durability and the reliability thereof is improved over those in the prior arts. The first conductive area CA1 and the second conductive areas CA2 can be referred to as the resistive touch switches.

Furthermore, during the removal process, the positions and patterns of the first conductive area CA1 and the second conductive areas CA2 can be customized. As such, the user experience is improved by adjusting the positions and patterns of the switches of the wearable electronic device 10 to best fit the user's needs.

Figure 1B:
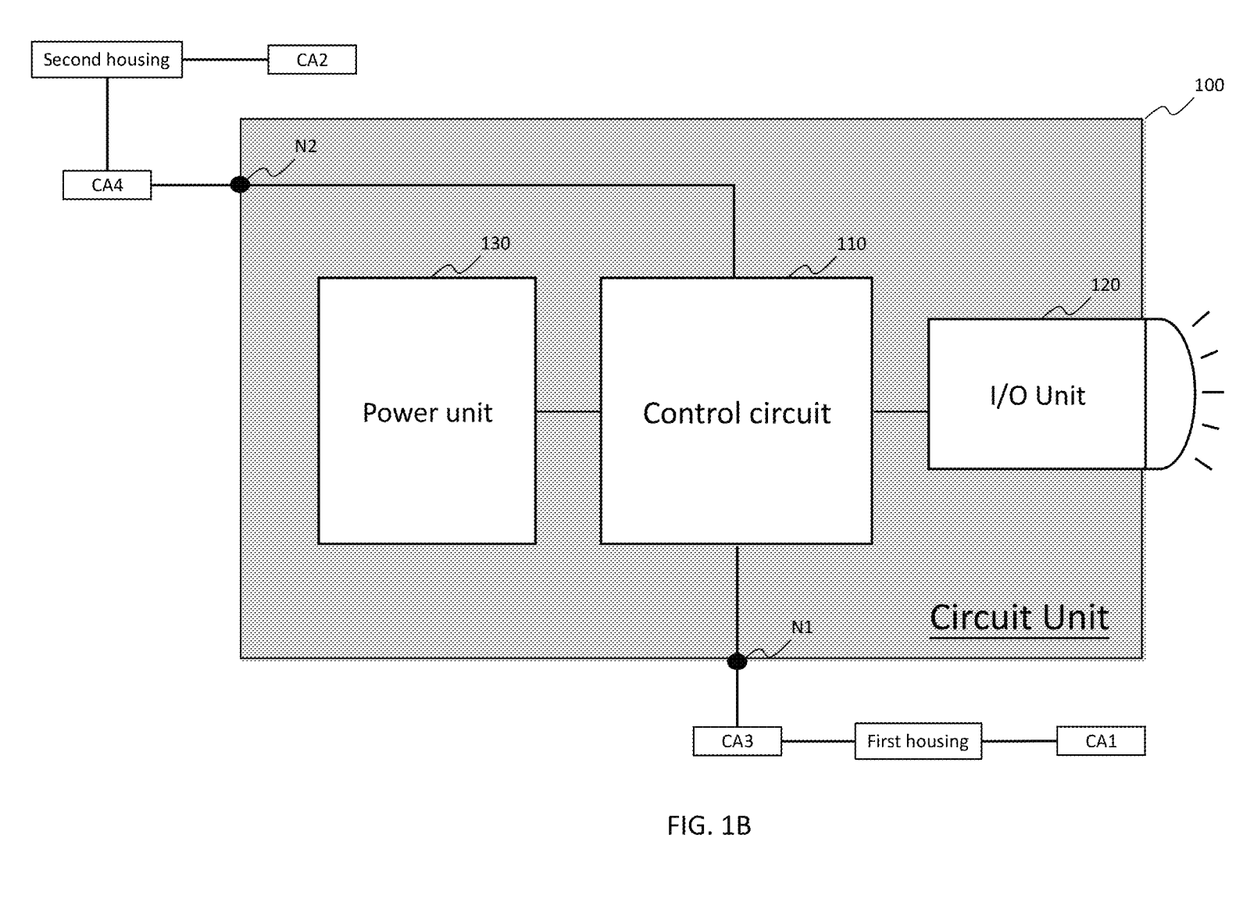
FIG. 1B depicts a block diagram illustrating a circuit unit of the wearable electronic device.

Referring to FIG. 1B in the following description. The circuit unit 100 includes a control circuit 110, an input/output unit (I/O unit) 120, and a power unit 130. The first node N1 and the second node N2 are coupled to the control circuit 110. The power unit 130 is configured to provide power/electricity to the I/O unit 120 via the control circuit 110. The power unit 130 is, for example, a rechargeable or non-rechargeable battery. The control circuit 110 is used to manage the overall operation of the wearable electronic device 10. In the embodiment, the control circuit is, for example, a microprocessor, programmable controller, application specific integrated circuits (ASIC), programmable logic device (PLD), or other similar devices.

In an embodiment, the I/O unit 120 is configured to emit light or laser beam. The I/O unit 120 is, for example, a light emitting diode (LED), or a laser diode. When the I/O unit 120 is enabled, the I/O unit 120 emits light beam via the LED or laser beam via the laser diode by the provided electricity. The second housing includes the light path/hole for emitting the light beam or laser beam.

In another embodiment, the I/O unit 120 is one or more of other types of devices for inputting (or generating) and/or outputting signals, for example, the I/O unit 120 includes at least one of a microphone, a speaker, an alarm, a sensor, a wireless signal transceiver, a projector and a camera.

When the I/O unit 120 is enabled as the microphone, the I/O unit 120 receives the sound and generates a corresponding audio signal. The generated audio signal may be transmitted to other wirelessly connected electronic device or stored in a storage circuit (not shown) of the circuit unit 100.

When the I/O unit 120 is enabled as the speaker, the I/O unit 120 outputs a sound according to sound data. The sound data can be a prerecorded data or data transferred from other wirelessly connected electronic device.

When the I/O unit 120 is enabled as the alarm, the I/O unit 120 outputs a notable preset alarm sound and/or a flashing light.

When the I/O unit 120 is enabled as the sensor, the I/O unit 120 senses the corresponding environmental variable(s) or object(s) according to the type of the sensor. The type of the sensor can be customized. For example, the sensor can be one of gas sensor, distance meter, proximity sensor, humidity sensor, liquid sensor, alcohol meter, material sensor, shape sensor, jewelry sensor, pulse rate monitor, blood oxygen monitor, temperature sensor, moisture sensor, pressure sensor, force meter, acceleration meter, gesture sensor, position monitor, vibration sensor, resistance sensor, and light sensor.

When the I/O unit 120 is enabled as the wireless signal transceiver, the I/O unit 120 transmits wireless signals to other electronic devices or broadcasts wireless signals. The wireless signals include, for example, control signals for controlling other electronic devices, data signals generated by the wearable electronic device 10 (e.g., sensed data, recorded sound/voice), pre-recorded data indicating one or more specific events (e.g., emergency call, position coordinates, NFC protocol data, RFID protocol data or the likes). Furthermore, when the 1/O unit 120 is enabled as the wireless signal transceiver, the I/O unit 120 is further configured to establish network connections to other electronic devices. The established network connection is used to transfer data.

When the I/O unit 120 is enabled as the projector, the I/O unit 120 projects images and/or videos. The data of the projected images or videos can be pre-recorded and retrieved from a storage circuit (not shown) of the circuit unit 100 or received from a wirelessly connected electronic device.

When the I/O unit 120 is enabled as the camera, the I/O unit 120 captures images and/or videos. The data of the captured images or videos can be recorded in a storage circuit (not shown) of the circuit unit 100 or be transmitted to a wirelessly connected electronic device.

Figure 2:
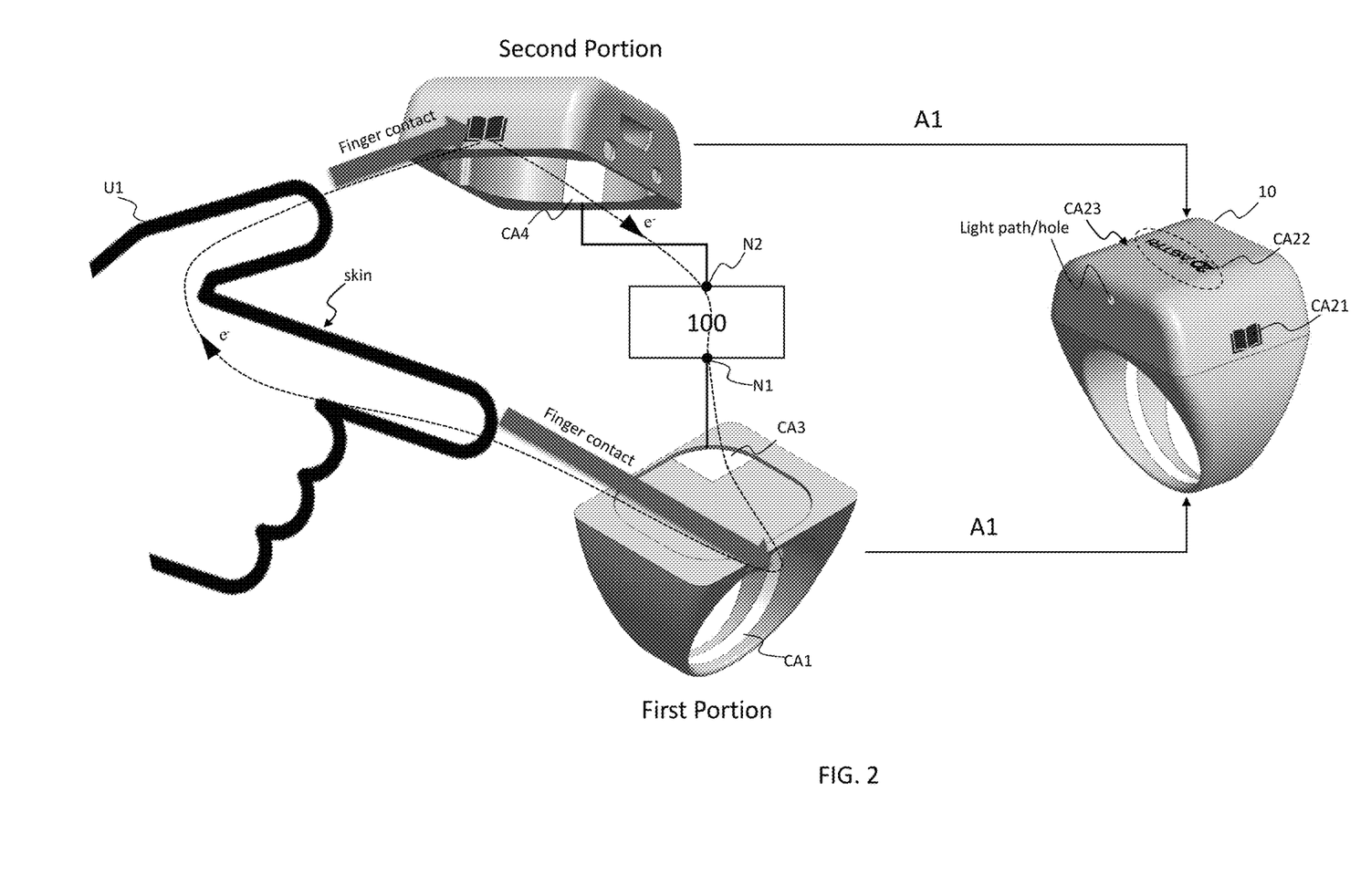
FIG. 2 depicts a schematic diagram illustrating a closed circuit formed by simultaneous user's body contacts on both of the conductive areas of the wearable electronic device.

Referring to FIG. 2 in the following description. The first conductive area CA1 and one or more second conductive areas CA2 (e.g., CA21, CA22, or/and CA23) are configured to allow being contacted simultaneously by a conductive object (e.g., two fingers of the user, a finger and another body part of the user, the user's finger and a conductive pen held by the user, or the likes). As illustrated by arrow A1, the first portion 200 and the second portion 300 may be configured structurally to combine to form the wearable electronic device 10.

To illustrate with an exemplary embodiment, when one of the user's fingers is wearing the wearable electronic device 10, the skin of the finger is in contact with the first conductive area CA1. When the user's other body part (e.g., thumb, another finger, palm, etc.) makes contact with one of the second conductive areas CA2 of the wearable electronic device 10, a closed circuit of the circuit unit 100 is formed with the conductive path (as illustrated by the dotted line) provided by the user's body between the two body parts that are in contact with the first conductive area CA1 and one of the second conductive areas CA2 respectively. That is, an electrical current e is generated according to the voltage of the power unit 130 and the effective resistance of the closed circuit when the closed circuit is formed. The electrical current e provided by the power unit 130 then enables/drives the control circuit 110 and the I/O unit 120.

In accordance to one embodiment of the present invention that is operating under a touch mode, whenever the first conductive area CA1 and at least one of the second conductive areas CA2 are contacted simultaneously and continuously by a conductive object (CA1 and CA2 being triggered) to form a closed circuit of the circuit unit 100, the control circuit 110 is powered, and the I/O unit 120 is enabled. On the contrary, whenever the first conductive area CA1 or all of the second conductive areas CA2 is not in contact with a conductive object, (e.g., the electrical circuit of the circuit unit 100 remains open, the control circuit 110 and the I/O unit 120 are unpowered and disabled. In other words, the I/O unit 120 is enabled continuously as long as the circuit unit 100 is under a closed circuit condition and the generated electrical current in the circuit unit 100 is sufficiently high.

Figure 3:
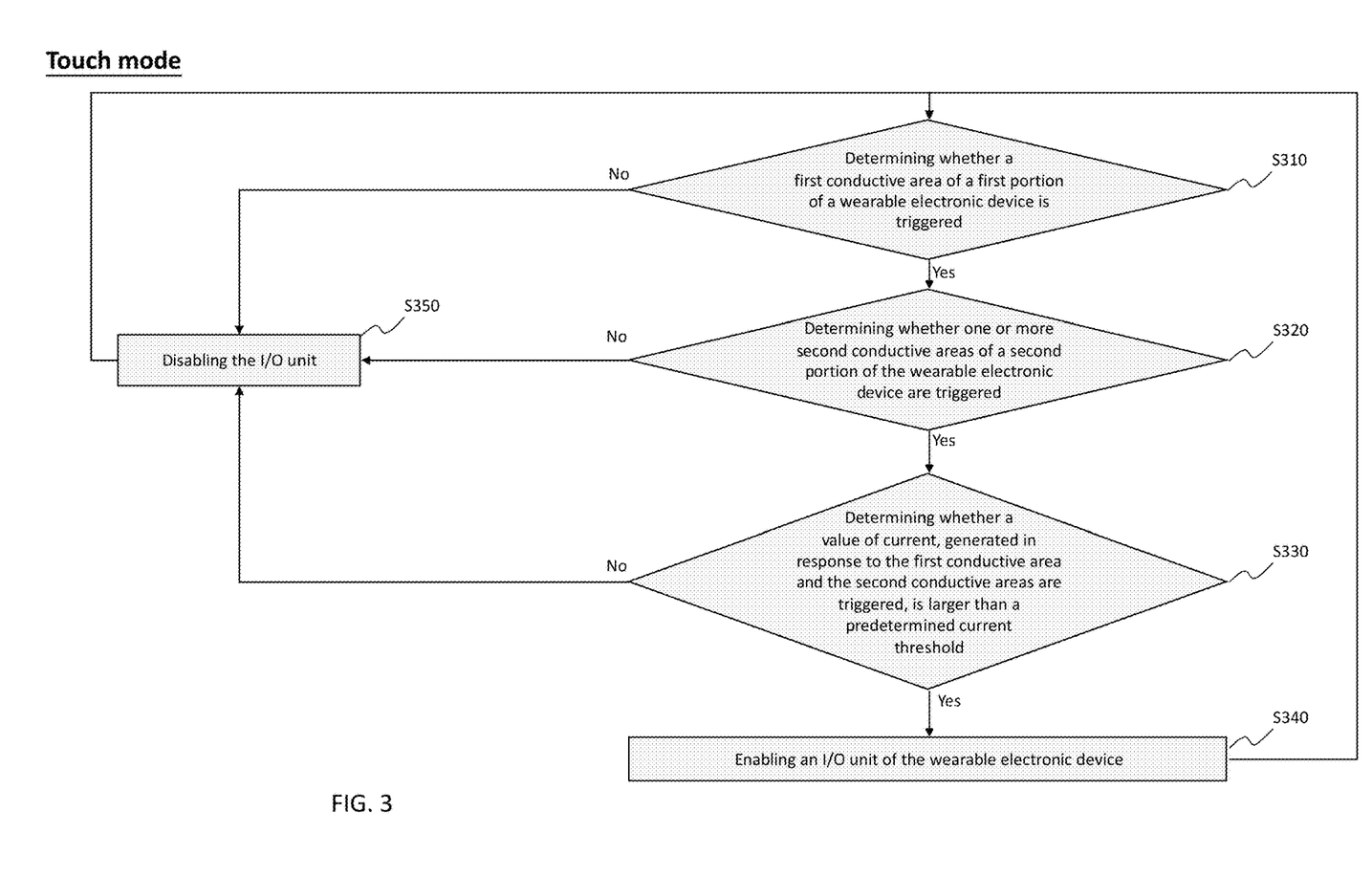
FIG. 3 depicts a flowchart of enabling an I/O unit of the wearable electronic device configured to operate under a touch mode.

Referring to FIG. 3 in the following description. In step S310, the control circuit 110 determines whether a first conductive area CA1 of a first portion 200 of a wearable electronic device 10 is in contact with a conductive object.

If the first conductive area CA1 of the first portion 200 of the wearable electronic device 10 is not in contact with a conductive object, continue to step S350. In step S350, the control circuit 110 disables the I/O unit 120 (e.g., the electricity provided from the power unit 130 is cut-off). Furthermore, in step S350, the circuit unit 100 is under an open circuit condition.

If the first conductive area CA1 of the first portion 200 of the wearable electronic device 10 is in contact with a conductive object, continue to step S320. The control circuit 110 determines whether one or more second conductive areas CA2 of a second portion 300 of the wearable electronic device 10 are also in contact with the conductive object.

If the second conductive areas CA2 of the second portion 300 of the wearable electronic device 10 are not in contact with the conductive object, continue to step S350. Otherwise, if the second conductive areas CA2 of the second portion 300 of the wearable electronic device 10 are in contact with the conductive object, continue to step S330. The control circuit 110 determines whether a value of the electrical current, generated in response to the first conductive area CA1 and the second conductive areas CA2 being in contact with the conductive object, is equal or larger than a predetermined minimum current threshold. The minimum current threshold can be determined from the output voltage of the power unit 130 and the effective resistance of the wearable electronic device 10.

If the value of current is smaller than the predetermined minimum current threshold, continue to step S350, and the control circuit 110 disables the I/O unit 120 of the wearable electronic device. Otherwise, if the value of current is equal or larger than the predetermined minimum current threshold, continue to step S340, and the control circuit 110 enables the I/O unit 120.

Figure 4:
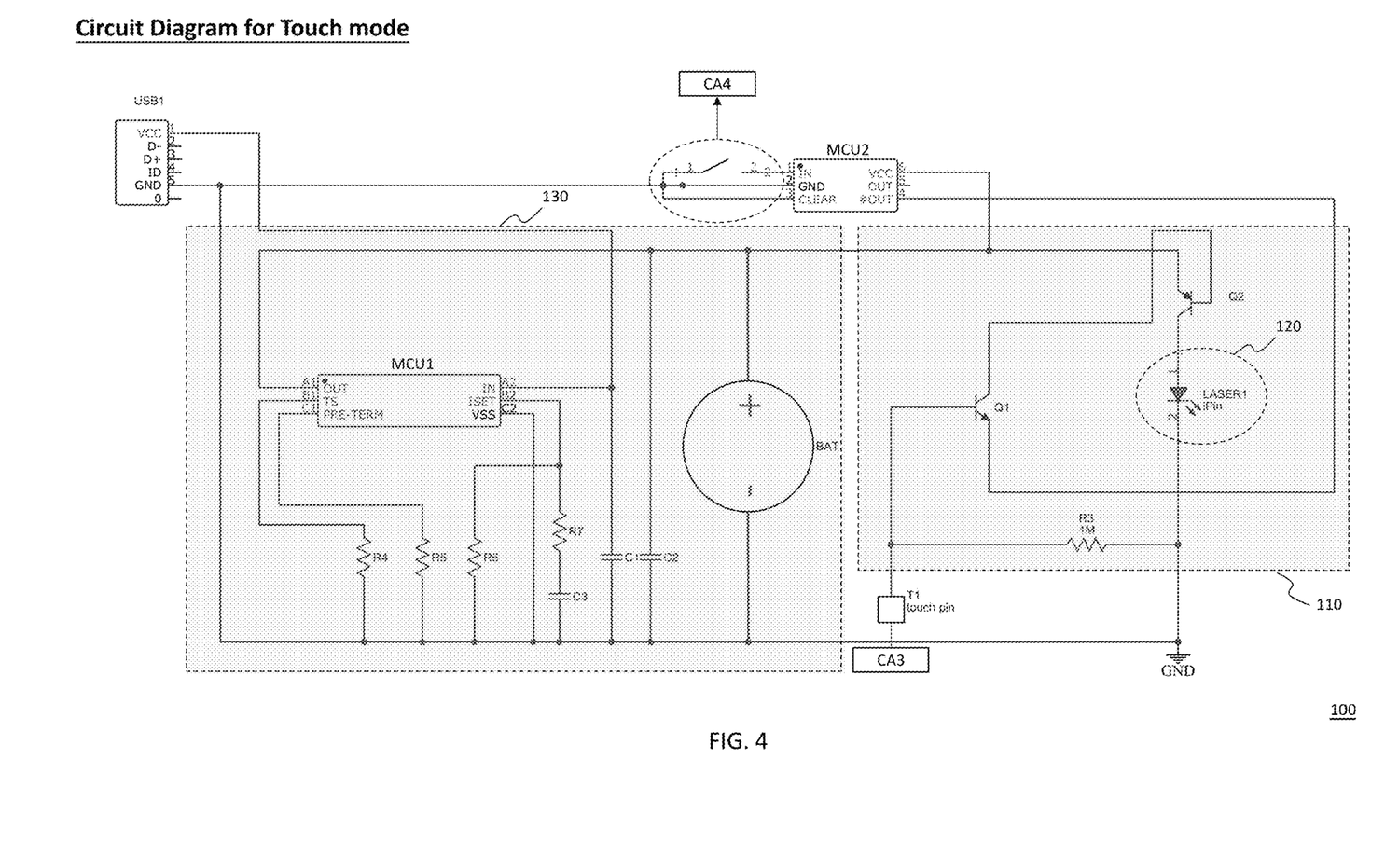
FIG. 4 depicts an exemplary embodiment of the circuit diagram of the circuit unit of the wearable electronic device configured to operate under the touch mode.

Referring to FIG. 4 in the following description. The control circuit 110 includes a Sziklai pair structure. Specifically, the control circuit 110 includes a NPN transistor Q1, a PNP transistor Q2 and a resistor R3. In one embodiment, the I/O unit 120 is a laser diode LASER1 electrically coupled to the control circuit 110. The power unit 130 includes a battery BAT, and a power management circuit. The power management circuit, as illustrated in FIG. 4, includes a power control unit MCU1, resistors R4 to R7, and capacitors C1 to C3; wherein the resistors R4 to R7 and the capacitors C1 to C3 are electrically coupled to the power control unit MCU1 and the battery BAT. The power control unit MCU1 is a Power Management Integrated Circuit (PMIC), which manages the charging cycle of the battery. For example, when the battery reached a fully charged state, the PMIC stops the charging, even if the device is connected to external power source via USB.

In another embodiment, the power unit 130 further includes a charge port USB1 electrically coupled to the power management circuit and the battery BAT. An external DC power source may supply electricity to the power unit 130 via the charge port USB1. Furthermore, the circuit unit 100 further includes a switch control unit MCU2 electrically coupled to the fourth conductive area CA4 and the control circuit 110. Moreover, a touch pin of the control circuit 110 is electrically coupled to the third conductive area CA3.

The switch control unit MCU2 and the fourth conductive area CA4 work in concert serving as a 'main' on/off switch for the device. The fourth conductive area CA4 is a generic momentary touch button switch for making ground connection at the input of the switch control unit MCU2. This is a trigger for changing the state of the output (OUT, #OUT) of the switch control unit MCU2, toggling from one state to another. The output is either in state 1 (high) or 0 (low). For this particular circuit, when the state of #OUT is 0 (low), the device is said to be 'active', and the Sziklai pair works in 'touch mode' to turn laser diode LASER1 on/off.

Figure 5:
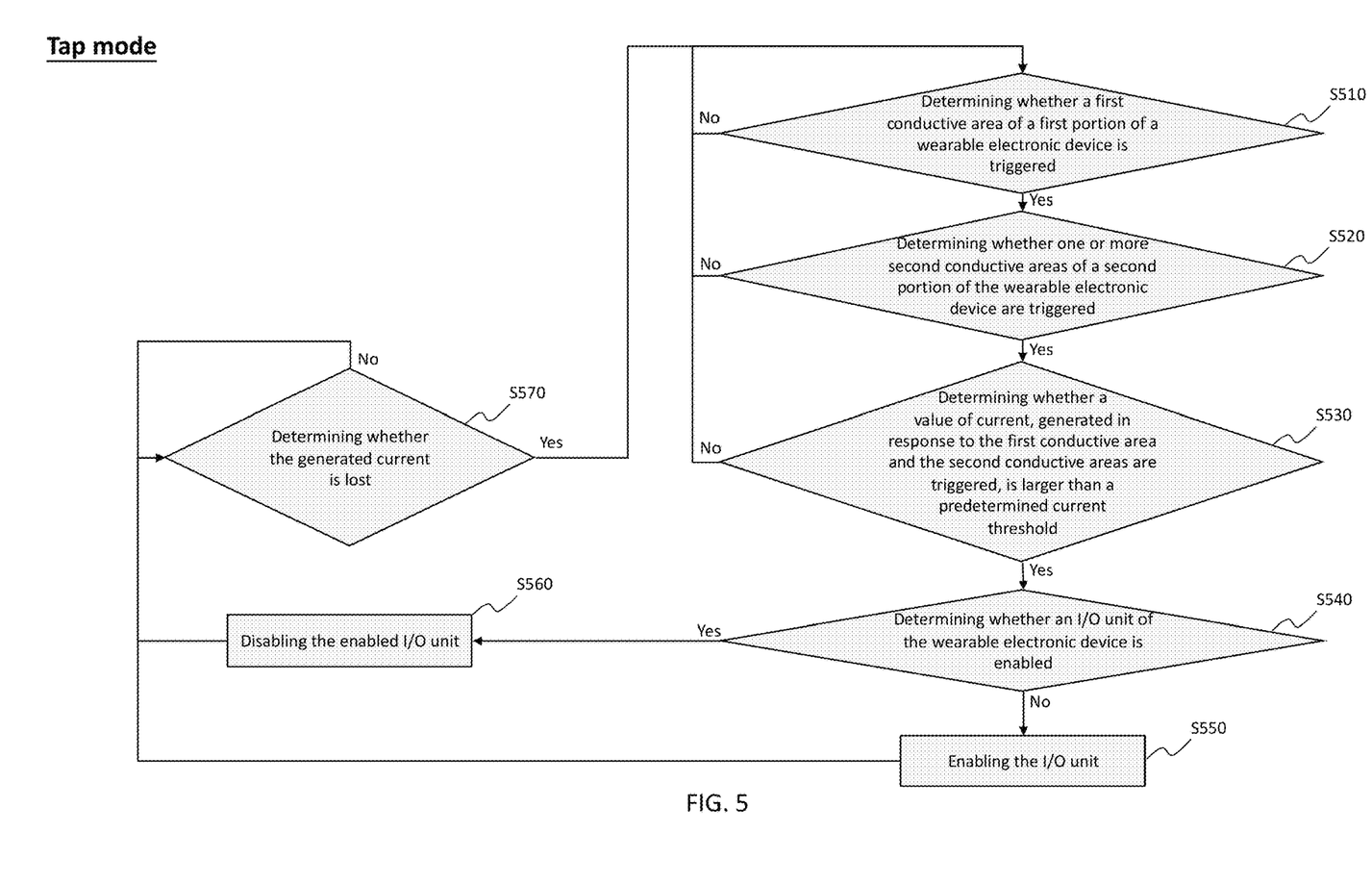
FIG. 5 depicts a flowchart of enabling an I/O unit of the wearable electronic device configured to operate under a tap mode.

In accordance to one embodiment of the present invention that is operating under a tap mode, whenever the first conductive area CA1 and one or more second conductive areas CA2 are contacted simultaneously and at least momentously by a conductive object (CA1 and CA2 being triggered) to form a closed circuit of the circuit unit 100, the control circuit 110 is powered and causes to change the status of the I/O unit 120 from the current state of the I/O unit 120 to another state. For example, whenever the first conductive area CA1 and one or more second conductive areas CA2 are triggered and the I/O unit 120 is enabled at the moment, the control circuit 110 disables the I/O unit 120. On the contrary, whenever the first conductive area CA1 and at least one of the second conductive areas CA2 are triggered and the I/O unit 120 is disabled at this moment, the control circuit 110 enables the I/O unit 120. In other words, the functional state of the I/O unit 120 is changed whenever a closed circuit of the circuit unit 100 (and the generated current is large enough) is formed.

Referring to FIG. 5 in the following description. In step S510, the control circuit 110 determines whether a first conductive area CA1 of a first portion 200 of a wearable electronic device 10 is in contact with a conductive object.

If the first conductive area CA1 of the first portion 200 of the wearable electronic device is in contact with a conductive object, continue to step S520. The control circuit 110 determines whether one or more second conductive areas CA2 of a second portion 300 of the wearable electronic device 10 are also in contact with the conductive object.

If the second conductive areas CA2 of the second portion 300 of the wearable electronic device 10 are in contact with the conductive object, continue to step S530. The control circuit 110 determines whether a value of the electrical current, generated in response to the first conductive area CA1 and the second conductive areas CA2 being in contact with the conductive object, is equal or larger than a predetermined minimum current threshold.

If the value of current is equal or larger than the predetermined minimum current threshold, continue to step S540, and the control circuit 110 determines whether an I/O unit 120 of the wearable electronic device 10 is enabled.

If the I/O unit 120 of the wearable electronic device 10 is not enabled, continue to step S550, and the control circuit 110 enables the I/O unit 120. Otherwise, if the I/O unit 120 of the wearable electronic device 10 is enabled, continue to step S560, and the control circuit 110 disables the enabled I/O unit 120.

Next, in step S570, the control circuit 110 determines whether the generated current is lost. If the generated current is lost, continue to step S510 (e.g., the operation for changing the status of the I/O unit 120 is complete). In other words, in step S570, control circuit 110 determines whether the tap operation corresponding to the triggered first conductive area CA1 and the triggered second conductive areas CA2 has ended (a closed circuit of the circuit unit 100 is changed to an open circuit, or, one of the triggered first conductive area CA1 and the triggered second conductive areas CA2 is no lingered being triggered) so as to prepare to detect next tap operation.

Figure 6:
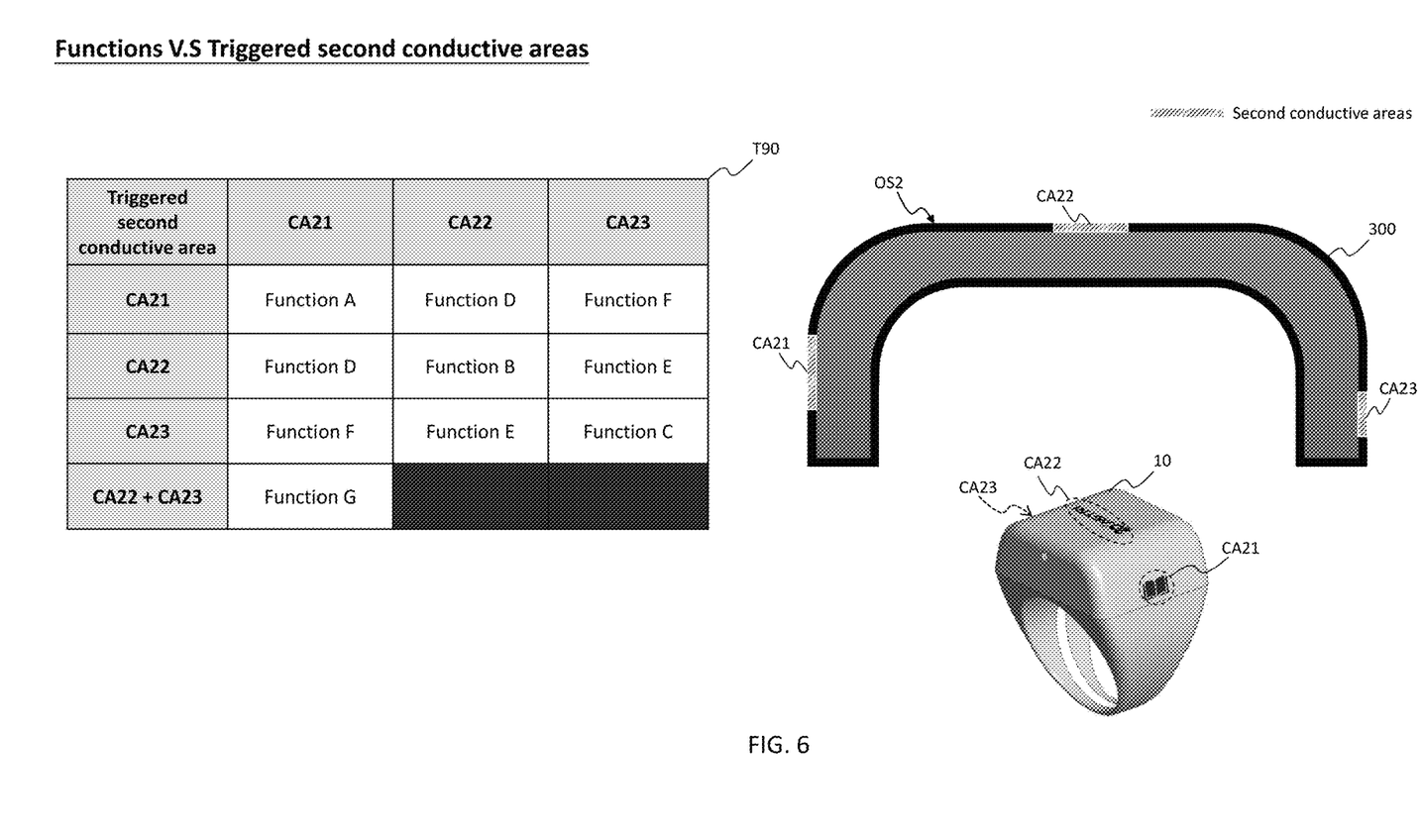
FIG. 6 depicts a schematic diagram illustrating different functions of the enabled I/O unit according to different triggered second conductive areas.

Referring to FIG. 6 in the following description. Under the configuration where there is a plurality of second conductive areas, the I/O unit 120 may be customized to have various functions corresponding to the different second conductive areas being triggered.

In an exemplary embodiment, assuming that the wearable electronic device 10 has three second conductive areas (CA21 to CA23) on the second outer surface OS2 of the second portion 300, and the first conductive area is already triggered. Table T90 summarized the enabled function corresponding to different triggered second conductive areas.

In one exemplary operation, when only the second conductive area CA21 is triggered, the control circuit 110 enables function A of the I/O unit 120; when only the second conductive area CA22 is triggered, the control circuit 110 enables function B of the I/O unit 120; when only the second conductive area CA23 is triggered, the control circuit 110 enables function C of the I/O unit 120; when the second conductive areas CA21 and CA22 are triggered at the same time, the control circuit 110 enables function D of the I/O unit 120; when the second conductive areas CA22 and CA23 are triggered at the same time, the control circuit 110 enables function E of the I/O unit 120; when the second conductive areas CA21 and CA23 are triggered at the same time, the control circuit 110 enables function F of the I/O unit 120, and when the second conductive areas CA21, CA22 and CA23 are all triggered at the same time, the control circuit 110 enables function G of the I/O unit 120.

In another exemplary operation, when the second conductive area CA21 is triggered, the I/O unit 120 is enabled to emit a laser beam (e.g., function A). Then, when the second conductive area CA22 is triggered, the I/O unit 120 is further enabled the function of the microphone (e.g., function B) to record the sounds and transfer corresponding sound signal to another electronic device.

In yet another exemplary operation, when the second conductive area CA23 is triggered, the I/O unit 120 is enabled the function of the wireless signal transceiver (e.g., function C) to establish network connection to another electronic device. Then, when the second conductive areas CA21 to CA23 are all triggered at the same time, the I/O unit 120 is further enabled the function of the projector (e.g., function G) to project image/video data received from the connected electronic device. Moreover, when the second conductive areas CA21 and CA22 are triggered at the same time, the I/O unit 120 is further enabled the function (e.g., function D) of the speaker to output sound corresponding to the projected image/video via sound data received from the connected electronic device.

The above exemplary embodiment and operations serve only as illustration of the present invention, an ordinarily skilled person in the art will appreciate that other structural and functional configurations and applications are possible and readily adoptable without undue experimentation and deviation from the spirit of the present invention.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A wearable electronic device, comprising:
a first portion (200), wherein the first portion comprises a first conductive area (CA1) on a first inner surface (IS1) of the first portion and a third conductive area (CA3) on a first outer surface (OS1) of the first portion; and
a second portion (300), wherein the second portion comprises one or more second conductive areas (CA2) on a second outer surface (OS2) of the second portion and a fourth conductive area (CA4) on a second inner surface (IS2) of the second portion, wherein the first portion is connected to the second portion,
wherein a circuit unit (100) is disposed in a second space of the second portion,
wherein a first node (N1) of the circuit unit is electrically connected to the third conductive area,
wherein a second node (N2) of the circuit unit is electrically connected to the fourth conductive area,
wherein the circuit unit is configured to enable an input/output (I/O) unit of the circuit unit in response to the first conductive area and the second conductive areas are triggered.

2. The wearable electronic device of claim 1, wherein
a first housing of the first portion is formed by a conductive material, and a second housing of the second portion is formed by the conductive material or a further conductive material,
the first outer surface and the first inner surface of the first housing except the first conductive area and the third conductive area are coated with an insulation material,
the second outer surface and the second inner surface of the second housing except the second conductive areas and the fourth conductive area are coated with the insulation material or a further insulation material.

3. The wearable electronic device of claim 1, wherein the circuit unit comprising:
a control circuit;
a power unit, wherein the power unit provides electricity for enabling the I/O unit; and
the I/O unit, wherein when the control circuit become a closed circuit in response to the first conductive area and the second conductive areas are triggered by conductive contacts respectively, the I/O unit is enabled via the provided electricity.

4. The wearable electronic device of claim 3, wherein in an operation of enabling the I/O unit of the circuit unit in response to the first conductive area and the second conductive areas are triggered,
the control circuit determines whether the first conductive area is triggered;
if the first conductive area is not triggered, the control circuit disables the I/O unit;
if the first conductive area is triggered, the control circuit determines whether the second conductive areas are triggered;
if the second conductive areas are not triggered, the control circuit disables the I/O unit;
if the second conductive areas are triggered, the control circuit determines whether a value of current, generated in response to the first conductive area and the second conductive areas are triggered, is larger than a predetermined minimum current threshold;
if the value of the current is smaller than the predetermined minimum current threshold, the control circuit disables the I/O unit; and
if the value of the current is equal or larger than the predetermined minimum current threshold, the control circuit enables the I/O unit.

5. The wearable electronic device of claim 3, wherein in an operation of enabling the I/O unit of the circuit unit in response to the first conductive area and the second conductive areas are triggered,
the control circuit determines whether a value of current, generated in response to the first conductive area and the second conductive areas of the wearable electronic device are triggered, is larger than a predetermined minimum current threshold;
if the value of the current is smaller than the predetermined minimum current threshold, the control circuit disables the I/O unit; and
if the value of the current is equal or larger than the predetermined minimum current threshold, the control circuit enables the I/O unit.

6. The wearable electronic device of claim 3, wherein in a first operation of enabling the I/O unit of the circuit unit in response to the first conductive area and the second conductive areas are triggered,
- the control circuit determines whether the first conductive area is triggered;
- if the first conductive area is triggered, the control circuit determines whether the second conductive areas are triggered;
- if the second conductive areas are triggered, the control circuit determines whether a value of current, generated in response to the first conductive area and the second conductive areas are triggered, is equal or larger than a predetermined minimum current threshold;
- if the value of the current is equal or larger than the predetermined minimum current threshold, the control circuit determining whether the I/O is enabled;
- if the I/O unit is not enabled, the control circuit enables the I/O unit;
- if the UO unit is enabled, the control circuit disables the UO unit;
- the control circuit determines whether the generated current is lost; and
- if the generated current is lost, the control circuit proceeds a second operation of determining whether the first conductive area is triggered again.

7. The wearable electronic device of claim 3, wherein in a first operation of enabling the I/O unit of the circuit unit in response to the first conductive area and the second conductive areas are triggered,
- the control circuit determines whether a value of current, generated in response to the first conductive area and the second conductive areas of the wearable electronic device are triggered, is equal or larger than a predetermined minimum current threshold;
- if the value of the current is equal or larger than the predetermined minimum current threshold, the control circuit determines whether the I/O unit is enabled;
- if the I/O unit is not enabled, the control circuit enables the UO unit;
- if the I/O unit is enabled, the control circuit disables the I/O unit;
- the control circuit determines whether the generated current is lost; and
- if the generated current is lost, the control circuit proceeds a second operation of determining whether the first conductive area is triggered again.

8. The wearable electronic device of claim 1, wherein
- a first housing of the first portion is formed by a conductive material, and a second housing of the second portion is formed by the conductive material or a further conductive material,
- the first outer surface and the first inner surface of the first housing are coated with an insulation material,
- the second outer surface and the second inner surface of the second housing are coated with the insulation material or a further insulation material;
- the first conductive area, the second conductive areas, the third conductive area and the fourth conductive area are formed by removing the insulation material or the further insulation material originally coated on the first conductive area, the second conductive areas, the third conductive area, and the fourth conductive area respectively.

9. The wearable electronic device of claim 1, wherein the I/O unit comprises:
- a light emitting diode (LED); or
- a laser diode, wherein when the I/O unit is enabled, the I/O unit emits light via the LED or laser light via the laser diode.

10. The wearable electronic device of claim 1, wherein the I/O unit comprises at least one of following:
- a microphone;
- a speaker;
- an alarm;
- a sensor;
- a wireless signal transceiver;
- a projector; and
- a camera.

11. The wearable electronic device of claim 1, wherein the control circuit enables different functions of the I/O unit according to a different trigger pattern of the triggered second conductive areas.

12. The wearable electronic device of claim 1, taking a form of a ring wearable on a human finger.

13. The wearable electronic device of claim 1, taking a form of an armband wearable on a human appendage.

* * * * *